US012597960B2

(12) United States Patent　　　　(10) Patent No.:　US 12,597,960 B2
Kim　　　　　　　　　　　　　　　(45) Date of Patent:　　　Apr. 7, 2026

---

(54) ELECTRONIC DEVICE AND HARMONIC CONTROL METHOD OF ELECTRONIC DEVICE

(71) Applicant: SAMSUNG ELECTRONICS CO., LTD., Suwon-si (KR)

(72) Inventor: Harksoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 288 days.

(21) Appl. No.: 18/477,782

(22) Filed: Sep. 29, 2023

(65) Prior Publication Data

US 2024/0030960 A1　　Jan. 25, 2024

Related U.S. Application Data

(63) Continuation of application No. PCT/KR2022/005115, filed on Apr. 8, 2022.

(30) Foreign Application Priority Data

Apr. 9, 2021　(KR) ........................ 10-2021-0046674

(51) Int. Cl.
　*H04B 1/40*　　　　(2015.01)
　*H04B 1/00*　　　　(2006.01)
　　　　(Continued)
(52) U.S. Cl.
　CPC ............ *H04B 1/403* (2013.01); *H04B 1/006* (2013.01); *H04B 1/0064* (2013.01); *H04B 1/48* (2013.01)
(58) Field of Classification Search
　CPC ...... H04B 1/0092; H04B 1/0064; H04B 1/04; H04B 2001/0408; H04B 1/0475;
　　　　(Continued)

(56) References Cited

U.S. PATENT DOCUMENTS

| | | |
|---|---|---|
| 8,400,224 B1 | 3/2013 | Au et al. |
| 8,773,200 B2 | 7/2014 | Severson et al. |
| | (Continued) | |

FOREIGN PATENT DOCUMENTS

| | | |
|---|---|---|
| CN | 108075803 A | 5/2018 |
| KR | 100349646 B1 | 8/2002 |
| | (Continued) | |

OTHER PUBLICATIONS

International Search Report for PCT/KR2022/005115 mailed Jun. 30, 2022, 6 pages.

(Continued)

*Primary Examiner* — Tuan Pham
(74) *Attorney, Agent, or Firm* — Nixon & Vanderhye, P.C.

(57)　　　　ABSTRACT

An electronic device according to an embodiment of the present disclosure may comprise: a processor; a memory electrically connected to the processor; a power management integrated circuit (PMIC) electrically connected to the processor; a radio frequency integrated circuit (RFIC) electrically connected to the processor; a power supply module including a power supply electrically connected to the PMIC and the processor; a front-end module including circuitry\electrically connected to the PMIC, the RFIC, and the power supply module, and is configured to modulate and amplify an RF signal received from the RFIC; a variable notch filter electrically connected to the power supply module and the front-end module, and connected to a transmission signal amplifier of the front-end module and configured to remove a harmonic frequency; and an antenna electrically connected to the front-end module, wherein the processor is configured to: control the PMIC and the power supply module to supply power to the front-end module; control a wireless communication operation to be performed using
(Continued)

multiple frequency bands; and based on performing the wireless communication operation using the multiple frequency bands, control impedance of the variable notch filter to adjust a frequency removal band of the variable notch filter based on a parameter pre-stored in the memory.

15 Claims, 5 Drawing Sheets

(51) Int. Cl.
    *H04B 1/403*        (2015.01)
    *H04B 1/48*        (2006.01)

(58) Field of Classification Search
    CPC . H04B 1/40; H04B 1/48; H04B 1/403; H04B 10/564
    See application file for complete search history.

(56)             References Cited

U.S. PATENT DOCUMENTS

| | | |
|---|---|---|
| 2012/0044919 A1 | 2/2012 | Medapalli et al. |
| 2013/0109334 A1 | 5/2013 | Kwon et al. |
| 2013/0187712 A1 | 7/2013 | Cabanillas et al. |
| 2014/0266455 A1 | 9/2014 | Kaatz et al. |
| 2015/0117279 A1 | 4/2015 | Kim |
| 2017/0214418 A1* | 7/2017 | Rozek .................... H03F 1/025 |
| 2018/0316311 A1* | 11/2018 | Gebeyehu .............. H03F 3/195 |
| 2019/0378640 A1* | 12/2019 | Cheng .................... H03F 3/193 |
| 2020/0186400 A1 | 6/2020 | Lee et al. |
| 2022/0029643 A1 | 1/2022 | Oh et al. |

FOREIGN PATENT DOCUMENTS

| | | |
|---|---|---|
| KR | 20070047486 A | 5/2007 |
| KR | 101221552 B1 | 1/2013 |
| KR | 101462552 B1 | 11/2014 |
| KR | 20150049946 A | 5/2015 |
| KR | 101555888 B1 | 9/2015 |
| KR | 10-2020-0071491 | 6/2020 |
| KR | 20200092145 A | 8/2020 |

OTHER PUBLICATIONS

Written Opinion of the ISA for PCT/KR2022/005115 mailed Jun. 30, 2022, 5 pages.
Korean Office Action issued Jun. 8, 2025 in corresponding Korean Patent Application No. 10-2021-0046674.
Korean Rejection Decision issued Feb. 24, 2026 in corresponding Korean Patent Application No. 10-2021-0046674.

\* cited by examiner

1

ELECTRONIC DEVICE AND HARMONIC CONTROL METHOD OF ELECTRONIC DEVICE

CROSS-REFERENCE TO RELATED APPLICATIONS

This application is a continuation of International Application No. PCT/KR2022/005115 designating the United States, filed on Apr. 8, 2022, in the Korean Intellectual Property Receiving Office and claiming priority to Korean Patent Application No. 10-2021-0046674, filed on Apr. 9, 2021, in the Korean Intellectual Property Office, the disclosures of each of which are incorporated by reference herein in their entireties.

BACKGROUND

Field

The disclosure relates to an electronic device and a harmonic control method of an electronic device.

Description of Related Art

Electronic devices capable of wireless communication are on the rise. An electronic device may support a communication system using various frequency domains, and may use various communication networks. When using a plurality of communication frequency bands at the same time, communication performance of an electronic device may deteriorate due to a harmonic.

SUMMARY

Embodiments of the disclosure may provide an electronic device and a harmonic control method of an electronic device that remove a harmonic component flowing into a power terminal when using a plurality of communication frequency bands at the same time.

An electronic device according to an example embodiment of the disclosure may include: a processor; a memory electrically connected to the processor; a power management integrated circuit (PMIC) electrically connected to the processor; a radio-frequency integrated circuit (RFIC) electrically connected to the processor; a power supply electrically connected to the PMIC and the processor; a front-end module comprising circuitry electrically connected to the PMIC, the RFIC, and the processor and configured to modulate and amplify an RF signal received from the RFIC; a variable notch filter electrically connected to the power supply module and the front-end module and connected to a transmission signal amplifier of the front-end module to remove a harmonic frequency; and an antenna electrically connected to the front-end module, wherein the processor may be configured to: control the PMIC and the power supply to supply power to the front-end module, control a wireless communication operation to be performed using a plurality of frequency bands, and control impedance of the variable notch filter to adjust a frequency rejection band of the variable notch filter, based on a parameter prestored in the memory based on performing the wireless communication operation using the plurality of frequency bands.

A harmonic control method of an electronic device according to an example embodiment of the disclosure may include: performing a wireless communication operation using a plurality of frequency bands; and controlling impedance of a variable notch filter to adjust a frequency rejection band of the variable notch filter, based on a parameter prestored in the memory based on performing the wireless communication operation using the plurality of frequency bands.

An electronic device and a harmonic control method of an electronic device according to various example embodiments of the disclosure may remove a harmonic component flowing into a power terminal, thereby improving communication performance.

BRIEF DESCRIPTION OF THE DRAWINGS

In describing the drawings, the same or like reference numerals may be used to refer to the same or like elements. Further, the above and other aspects, features and advantages of certain embodiments of the present disclosure will be more apparent from the following detailed description, taken in conjunction with the accompanying drawings, in which.

DETAILED DESCRIPTION

Figure 1:
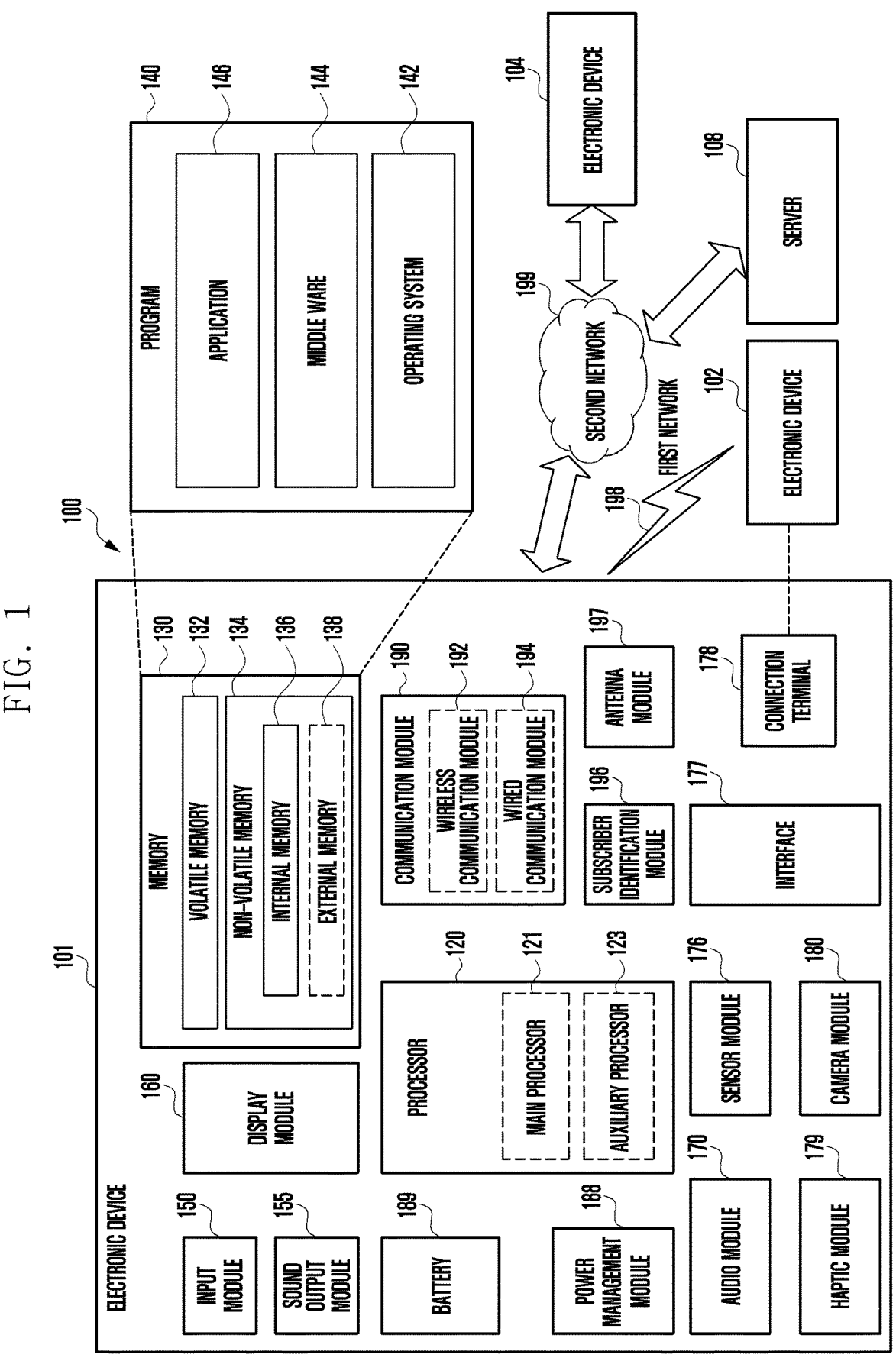
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
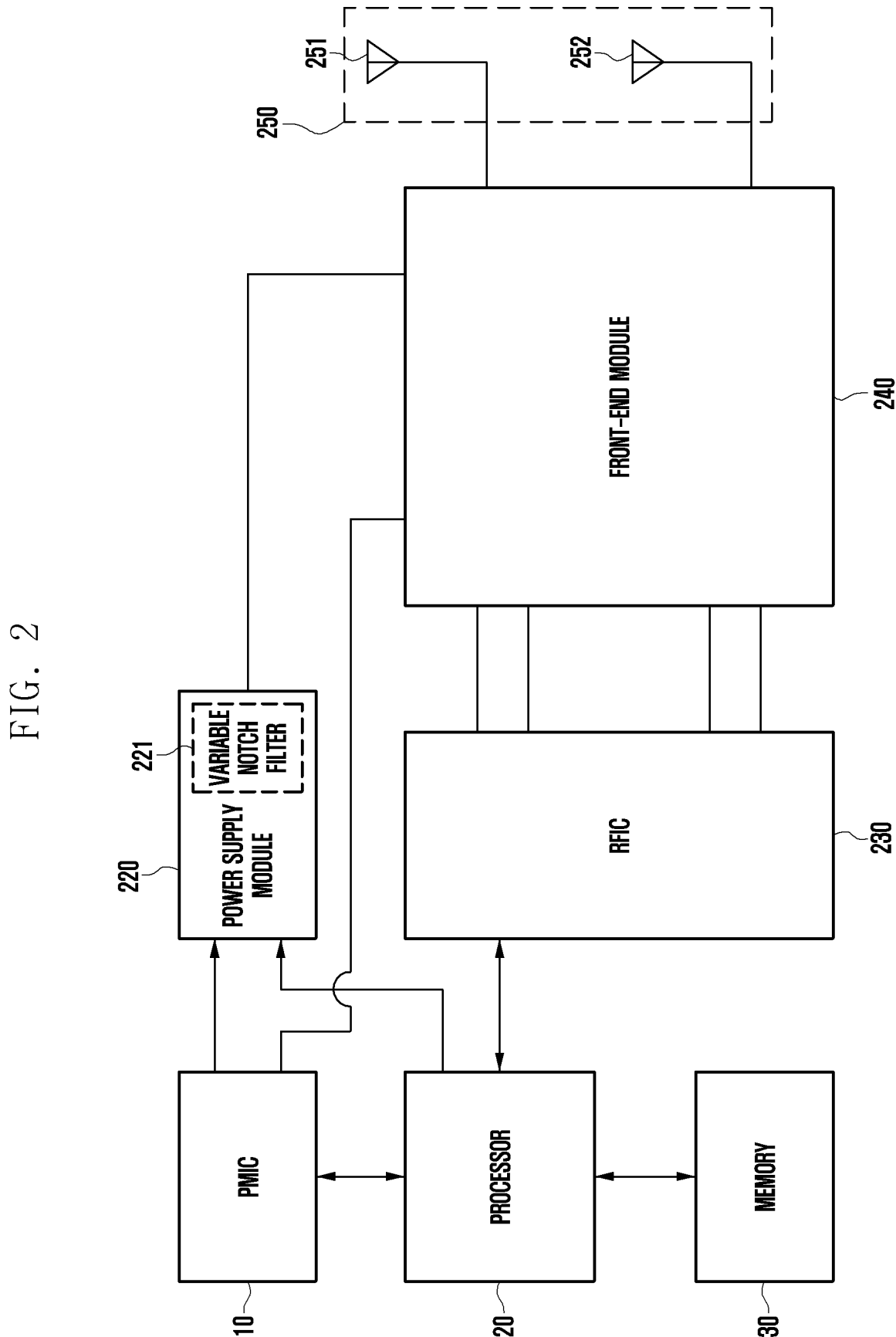
FIG. 2 is a block diagram illustrating an example configuration of an electronic device including a variable notch filter according to various embodiments.

FIG. 2 is a block diagram illustrating an example configuration of an electronic device 101 including a variable notch filter 221 according to various embodiments.

The electronic device 101 may include a processor (e.g., including processing circuitry) 120, a memory 130, a power management integrated circuit (PMIC) 210, a power supply module (e.g., including a power supply) 220, a radio-frequency integrated circuit (RFIC) 230, a front-end module (e.g., including various circuitry) 240, and an antenna 250.

In an embodiment, a network 198 (the network 198 of FIG. 1) may further include at least one different network 199 (the network 199 of FIG. 2). For example, the electronic device 101 may include a 5G network and/or a 4G network.

The processor 120 may include various processing circuitry including, for example, a communication processor and/or an application processor.

The processor 120 may generate a baseband signal used in the network, and may transmit the baseband signal to the RFIC 230. The processor 120 may receive a signal converted into a baseband signal from the RFIC 230.

According to various embodiments, the processor 120 may transmit and receive a transmission signal of a first network, a reception signal of the first network, a transmission signal of a second network, and/or a reception signal of the second network to and from the RFIC 230.

According to various embodiments, the processor 120 may transmit and receive a first-band transmission signal of the first network, a first-band reception signal of the first network, a second-band transmission signal of the first network, and a second-band reception signal of the first network to and from the RFIC 230.

According to various embodiments, the processor 120 may transmit and receive a first-band transmission signal of the second network, a first-band reception signal of the second network, a second-band transmission signal of the second network, and a second-band reception signal of the second network to and from the RFIC 230.

For example, the first network may be a legacy network, and the second network may be a 5G network.

According to various embodiments, the processor 120 may establish a communication channel of a band to be used for wireless communication with the network, and may support network communication through the established communication channel.

The processor 120 may control an operation of the PMIC 210, the power supply module 220, and/or the variable notch filter 221, based on a frequency according to a network band. The processor 120 may control an operating frequency of the variable notch filter 221, based on data prestored in the memory 130. The processor 120 may control a frequency band relating to an operation of the variable notch filter 221, based on data prestored in the memory 130. For example, the processor 120 may adjust a frequency rejection band of the variable notch filter 221 to a frequency rejection band corresponding to a frequency combination relating to harmonic generation.

In an embodiment, a prestored (e.g., stored) parameter corresponding to prestored data about the frequency combination relating to harmonic generation may be included. The prestored parameter may be a parameter for changing the resistance of a variable resistor included in the variable notch filter 221, the capacitance of a variable capacitor included therein, and/or the inductance of a variable inductor included therein for an operation of the variable notch filter 221 in the frequency rejection band. The prestored parameter may be a parameter for changing the impedance of the variable resistor included in the variable notch filter 221, the impedance of the variable capacitor included therein, and/or the impedance of the variable inductor included therein for the operation of the variable notch filter 221 in the frequency rejection band.

In an embodiment, the prestored parameter may be a parameter for changing the impedance of the variable resistor included in the variable notch filter 221, the impedance of the variable capacitor included therein, and/or the impedance of the variable inductor included therein for the operation of the variable notch filter 221 in the frequency rejection band. The prestored parameter may be data for controlling impedance values of the variable resistor, the variable capacitor, and/or the variable inductor included in the variable notch filter 221.

The processor 120 may control the impedance of the variable resistor of the variable notch filter 221, the impedance of the variable capacitor, and/or the impedance of the variable inductor, based on the parameter prestored in the memory 130. The processor 120 may control the resistance of the variable resistor of the variable notch filter 221, the capacitance of the variable capacitor, and/or the inductance of the variable inductor, based on the parameter prestored in the memory 130.

In an embodiment, the processor 120 may remove a frequency of a harmonic component by controlling the resistance of the variable resistor of the variable notch filter 221, the variable capacitor, and/or the variable inductor. The processor 120 may change the frequency rejection band of the variable notch filter 221 by changing the impedance of the variable resistor of the variable notch filter 221 or the capacitance of the variable capacitor and/or the variable inductor.

In an embodiment, the processor 120 may change the frequency rejection band of the variable notch filter 221 by changing the impedance of the variable resistor of the variable notch filter 221 or the capacitance of the variable capacitor and/or the variable inductor, based on data prestored in the memory 130. The prestored data may, for example, be as shown in Table 1.

TABLE 1

| Frequency 1 (MHz) | | Harmonic order | Harmonic frequency (MHz) | Receiving sensitivity deterioration band |
|---|---|---|---|---|
| B5 | 824 | 6 | 4944 | n79 |
| B5 | 836 | 4 | 3344 | n77/n78 |
| B12 | 699 | 7 | 4893 | n79 |
| B8 | 890 | 4 | 3560 | n77/n78 |
| B1 | 1950 | 2 | 3900 | n77 |
| B2 | 1880 | 2 | 3760 | n77/n78 |
| B3 | 1747 | 2 | 3494 | n77/n78 |

In communication using two or more frequency bands of the network, the processor 120 may control the variable notch filter 221, based on the prestored data about the frequency combination relating to harmonic generation. The electronic device 101 may prestore a parameter for controlling the variable notch filter 221 in the memory 130, based on the prestored data about the frequency combination relating to harmonic generation. For example, the parameter prestored in the memory 130 may be a parameter for changing the resistance of the variable resistor included in the variable notch filter 221 or the impedance of the variable capacitor and/or the variable inductor. The electronic device 101 may include a parameter for changing the impedance of the variable notch filter 221 and/or changing the frequency rejection band of the variable notch filter 221 corresponding to the prestored data in the memory 130. The electronic device 101 may remove a harmonic by changing the impedance of the variable notch filter 221 or changing the frequency rejection band of the variable notch filter 221, based on the data prestored in the memory 130. For example, referring to Table 1, the electronic device 101 may perform communication using a B8 transmission signal band (890 MHz) of the legacy network (e.g., a 4G network) and an n78 reception signal band (3560 MHz) of the 5G network. Here, since a quadruple frequency (3560 MHz) of the B8 transmission signal band matches the n78 reception signal band, the processor 120 may control the frequency rejection band of the variable notch filter 221 to match the n78 reception signal band. The variable notch filter 221 may be connected to a power source of a signal amplifier included in an RF signal transmission terminal to remove a frequency of a harmonic component.

The processor 120 may control the PMIC 210 to supply power to a signal amplifier included in an RF signal reception terminal included in the front-end module 240.

The processor 120 may control the power supply module 220 to supply power to the signal amplifier included in the RF signal transmission terminal included in the front-end module 240.

The PMIC 210 may supply power to the signal amplifier of the RF signal reception terminal included in the front-end module 240 under control of the processor 120.

The power supply module 220 may include the variable notch filter 221. The power supply module 220 may supply power to the signal amplifier of the RF signal transmission terminal included in the front-end module 240 under control of the processor 120.

The variable notch filter 221 may be connected to the power source of the signal amplifier included in the RF signal transmission terminal to remove a frequency of a harmonic component under control of the processor 120.

In transmission, the RFIC 230 may convert a baseband signal generated by the processor 120 into a radio-frequency (RF) signal used in the network. In reception, the RFIC 230 may obtain an RF signal from the network via the antenna 250.

The RF signal obtained through the antenna 250 may be preprocessed through the front-end module 240. The RFIC 230 may convert the preprocessed RF signal into a baseband signal to be processed by the processor 120.

The front-end module 240 may detect a signal component of the network received from the antenna 250 and may amplify or modulate the signal component to transmit the same to the RFIC 230, or may amplify or modulate an RF signal received from the RFIC 230 to transmit the signal to the antenna 250.

According to various embodiments, the antenna 250 may include a plurality of antennas 251 and 252. The antenna 250 may be electrically connected to the front-end module 240. The antenna 250 may radiate a signal received from the front end module 240. The antenna 250 may transmit an RF signal received from the network to the front-end module 240.

Figure 3:
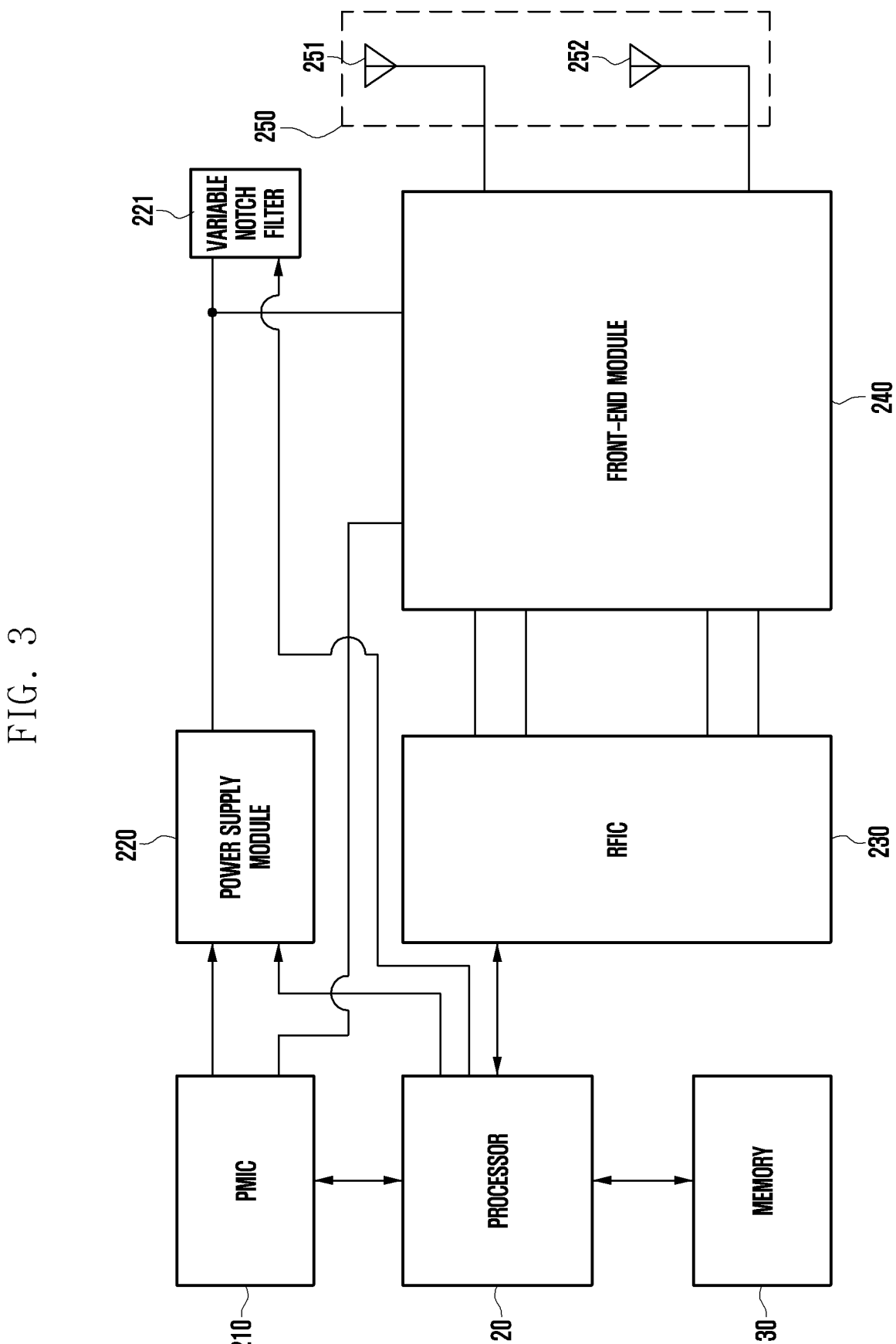
FIG. 3 is a block diagram illustrating an example configuration of an electronic device including a variable notch filter according to various embodiments.

FIG. 3 is a block diagram illustrating an example configuration of an electronic device 101 including a variable notch filter 221 according to various embodiments.

FIG. 3 may be the same as or similar to FIG. 2 in components and arrangement except for the arrangement of the variable notch filter 221. The variable notch filter 221 may be disposed as a separate component instead of being included in a power supply module 220. The variable notch filter 221 may be connected to a power source of a power amplifier included in an RF signal transmission terminal to remove a frequency of a harmonic component under control of the processor 120.

The processor 120 may remove a frequency of a harmonic component by controlling the resistance of a variable resistor, a variable capacitor, and/or a variable inductor of the variable notch filter 221. The processor 120 may change a frequency rejection band of the variable notch filter 221 by changing the impedance of the variable resistor of the variable notch filter 221 or the capacitance of the variable capacitor and/or the variable inductor.

Figure 4:
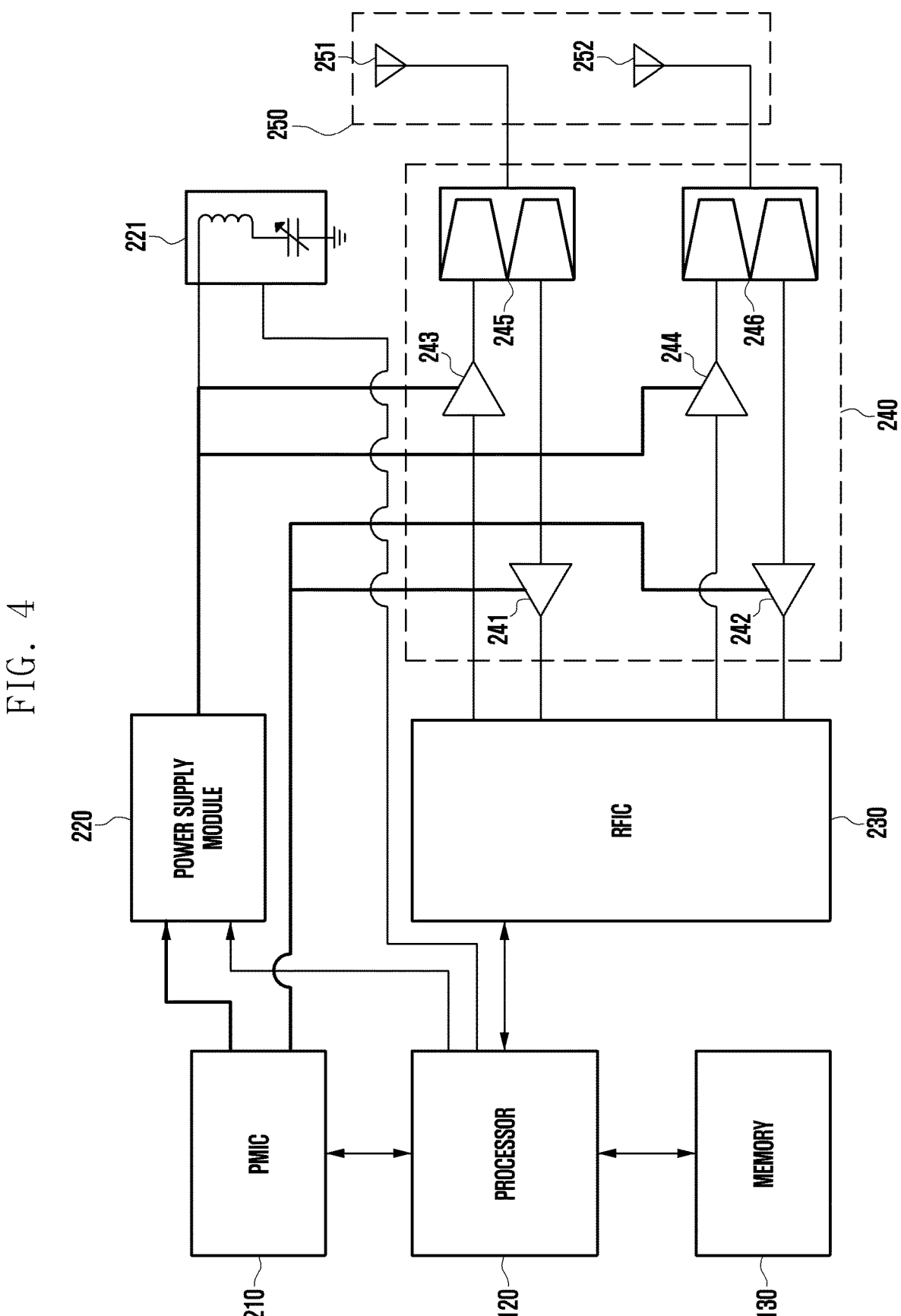
FIG. 4 is a block diagram illustrating an example configuration of an electronic device including a variable notch filter according to various embodiments.

FIG. 4 is a block diagram illustrating an example configuration of an electronic device 101 including a variable notch filter 221 according to various embodiments.

FIG. 4 shows the variable notch filter 221 and the front-end module 240 of FIG. 2 and FIG. 3 in greater detail.

In an embodiment, the front-end module 240 may include a first reception signal amplifier 241, a second reception signal amplifier 242, a first transmission signal amplifier 243, a second transmission signal amplifier 244, a first duplexer 245, and/or a second duplexer 246.

The first reception signal amplifier 241 and/or the first duplexer 245 may receive an RF signal of a first network from a first antenna 251, and may modulate or amplify the RF signal to transmit the modulated or amplified signal to an RFIC 230.

The first transmission signal amplifier 243 and/or the first duplexer 245 may modulate or amplify an RF signal of the first network to transmit the modulated or amplified signal to the first antenna 251.

The first reception signal amplifier 241 and/or the first duplexer 245 may receive an RF signal of the first network from the first antenna 251, and may modulate or amplify the RF signal to transmit the modulated or amplified signal to the RFIC 230.

The second reception signal amplifier 242 and/or the second duplexer 246 may receive an RF signal of a second network from a second antenna 252, and may modulate or amplify the RF signal to transmit the modulated or amplified signal to the RFIC 230.

The second transmission signal amplifier 244 and/or the second duplexer 246 may modulate or amplify an RF signal of the second network to transmit the modulated or amplified signal to the second antenna 252.

The front-end module 240 may further include a switch (not shown) between the first duplexer 245 and the first antenna 251. The front-end module 240 may further include a switch (not shown) between the second duplexer 246 and the second antenna 252.

A PMIC 210 may be connected to a power source of the first reception signal amplifier 241 and/or the second reception signal amplifier 242. The PMIC 210 may supply power to the first reception signal amplifier 241 and/or the second reception signal amplifier 242 under control of a processor 120.

A power supply module 220 may be connected to a power source of the first transmission signal amplifier 243 and/or the second transmission signal amplifier 244. The power supply module 220 may supply power to the first transmission signal amplifier 243 and/or the second transmission signal amplifier 244 under control of the processor 120.

The variable notch filter 221 may include a variable resistor, a variable capacitor, and/or a variable inductor. The processor 120 may remove a frequency of a harmonic component by controlling the variable resistor, the variable capacitor, and/or the variable inductor of the variable notch filter 221. The processor 120 may change a frequency rejection band of the variable notch filter 221 by changing the impedance of the variable resistor of the variable notch filter 221 or the capacitance of the variable capacitor and/or the variable inductor. The variable notch filter 221 may change the frequency rejection band of the variable notch filter 221 by changing the impedance of the variable resistor or the capacitance of the variable capacitor and/or the variable inductor under control of the processor 120.

Figure 5:
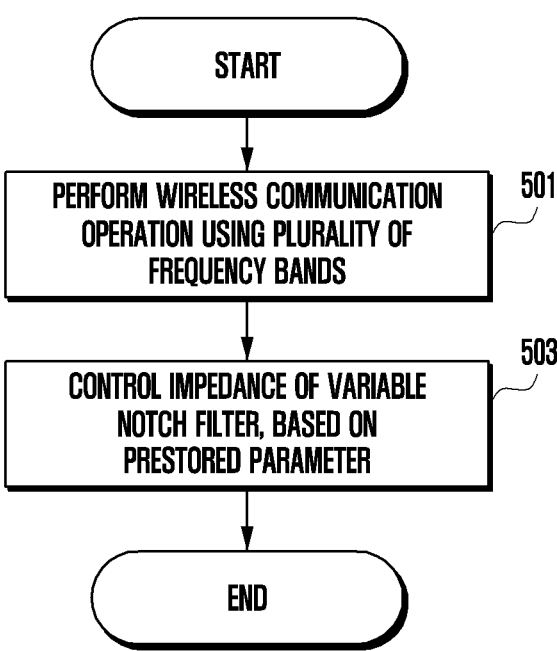
FIG. 5 is a flowchart illustrating an example harmonic control method of an electronic device according to various embodiments.

FIG. 5 is a flowchart illustrating an example harmonic control method of an electronic device 101 according to various embodiments.

In operation 501, the electronic device 101 may perform a wireless communication operation using a plurality of frequency bands under control of a processor 120.

In an embodiment, in operation 501, the electronic device 101 may perform a wireless communication operation using two or more bands under control of the processor 120.

In an embodiment, in operation 501, the electronic device 101 may perform a wireless communication operation using a first network and a second network under control of the processor 120.

In operation 503, the electronic device 101 may control the impedance of a variable notch filter, based on a prestored parameter under control of the processor 120.

In an embodiment, in operation 503, the electronic device 101 may control the impedance of a variable resistor of the variable notch filter 221, the impedance of a variable capacitor, and/or the impedance of a variable inductor, based on a parameter prestored in the memory 130 under control of the processor 120. The processor 120 may control the resistance of the variable resistor of the variable notch filter 221, the capacitance of the variable capacitor, and/or the inductance of the variable inductor, based on a parameter prestored in the memory 130.

The electronic device 101 may prestore a parameter for controlling the variable notch filter 221 for removing a harmonic in the memory 130, based on prestored data about a frequency combination relating to harmonic generation. For example, the parameter prestored in the memory 130 may be a parameter for changing the impedance of the variable resistor included in the variable notch filter 221 or the impedance of the variable capacitor and/or the variable inductor. The electronic device 101 may include a parameter for changing the impedance of the variable notch filter 221 and/or a frequency rejection band of the variable notch filter 221 corresponding to the prestored data in the memory 130. The electronic device 101 may remove a harmonic by changing the impedance of the variable notch filter 221 or changing the frequency rejection band of the variable notch filter 221, based on the parameter prestored in the memory 130.

In an embodiment, in operation 503, the electronic device 101 may control the frequency rejection band of the variable notch filter 221 and/or the impedance of the variable notch filter 221, based on the prestored parameter, under control of the processor 120.

In communication using a plurality of frequency bands (e.g., two or more frequency bands) of a network, the electronic device 101 may control the variable notch filter 221, based on a prestored parameter corresponding to the prestored data about the frequency combination relating to harmonic generation, under control of the processor 120 in operation 503.

In an embodiment, the electronic device 101 may perform communication using a transmission signal band of a first network and a reception signal band of a second network. A frequency N times the transmission signal band of the first network (N is an integer equal to or greater than 2) may match the reception signal band of the second network. The processor 120 may control the frequency rejection band of the variable notch filter 221 to match the reception signal band of the second network, based on the prestored parameter and/or the prestored data. The variable notch filter 221 may be connected to a power source of a signal amplifier included in an RF signal transmission terminal to remove a frequency of a harmonic component.

In an embodiment, in operation 503, under control of the processor 120, the electronic device 101 may control an RF signal of a first network frequency band to be radiated through an antenna, and may control the variable notch filter 221 to remove a harmonic frequency of the RF signal of the first network frequency band, based on the prestored parameter and/or the prestored data, upon receiving an RF signal of a second network frequency band from the antenna.

In an embodiment, in operation 503, under control of the processor 120, the electronic device 101 may control the RF signal of the second network frequency band to be radiated through the antenna, and may control the variable notch filter 221 to remove a harmonic frequency of the RF signal of the second network frequency band, based on the prestored parameter and/or the prestored data, upon receiving the RF signal of the first network frequency band from the antenna.

In an embodiment, in operation 503, the electronic device 101 may control an operating frequency of the variable notch filter, based on the prestored data under the control of the processor 120.

In communication using a plurality of frequency bands (e.g., two or more frequency bands) of a network, the electronic device 101 may control the variable notch filter 221, based on the prestored data about the frequency combination relating to harmonic generation, under control of the processor 120 in operation 503.

In an embodiment, the electronic device 101 may perform communication using a transmission signal band of a first network and a reception signal band of a second network. A frequency N times the transmission signal band of the first network (N is an integer equal to or greater than 2) may match the reception signal band of the second network. The processor 120 may control the frequency rejection band of the variable notch filter 221 to match the reception signal band of the second network. The variable notch filter 221 may be connected to the power source of the signal amplifier included in the RF signal transmission terminal to remove a frequency of a harmonic component.

In an embodiment, in operation 503, under control of the processor 120, the electronic device 101 may control an RF signal of a first network frequency band to be radiated through the antenna, and may control the variable notch filter 221 to remove a harmonic frequency of the RF signal of the first network frequency band upon receiving an RF signal of a second network frequency band from the antenna.

In an embodiment, in operation 503, under control of the processor 120, the electronic device 101 may control the RF signal of the second network frequency band to be radiated through the antenna, and may control the variable notch filter 221 to remove a harmonic frequency of the RF signal of the second network frequency band upon receiving the RF signal of the first network frequency band from the antenna.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), the element may be coupled/connected with/to the other element directly (e.g., wiredly), wirelessly, or via a third element.

As used herein, the term "module" may include a unit implemented in hardware, software, or firmware, or any combination thereof, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities mat be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
 a processor;
 a memory electrically connected to the processor;
 a power management integrated circuit (PMIC) electrically connected to the processor;
 a radio-frequency integrated circuit (RFIC) electrically connected to the processor;
 a power supply module including a power supply electrically connected to the PMIC and the processor;
 a front-end module including circuitry electrically connected to the PMIC, the RFIC, and the processor and configured to modulate and amplify an RF signal received from the RFIC;

15 a variable notch filter electrically connected to the power supply module and the front-end module and connected to a transmission signal amplifier of the front-end module and configured to remove a harmonic frequency; and an antenna electrically connected to the front-end module, wherein the processor is configured to:

control the PMIC and the power supply module to supply power to the front-end module;

control a wireless communication operation to be performed using a plurality of frequency bands; and control impedance of the variable notch filter to adjust a frequency rejection band of the variable notch filter, based on a parameter prestored in the memory based on performing the wireless communication operation using the plurality of frequency bands.

2. The electronic device of claim 1, wherein the prestored parameter corresponds to prestored data about a frequency combination relating to harmonic generation, and comprises information about a change in the impedance of the variable notch filter.

3. The electronic device of claim 1, wherein the front-end module is configured to transmit an RF signal of a first network frequency band and a second network frequency band to the antenna, or to receive the RF signal from the antenna.

4. The electronic device of claim 3, wherein the front-end module is configured to:

receive the RF signal of the first network frequency band from the antenna, modulate and amplify the RF signal, and transmit the RF signal to the RFIC;

receive the RF signal of the first network frequency band from the RFIC, and transmit the RF signal to the antenna;

receive the RF signal of the second network frequency band from the antenna, modulate and amplify the RF signal, and transmit the RF signal to the RFIC; and receive the RF signal of the second network frequency band from the RFIC, and transmit the RF signal to the antenna.

5. The electronic device of claim 4, wherein the front-end module comprises:

a first reception signal amplifier configured to: receive the RF signal of the first network frequency band from the antenna, modulate and amplify the RF signal, and transmit the RF signal to the RFIC; and a first transmission signal amplifier configured to: receive the RF signal of the first network frequency band from the RFIC, and transmit the RF signal to the antenna.

6. The electronic device of claim 3, wherein the front-end module comprises:

a second reception signal amplifier configured to: receive the RF signal of the second network frequency band from the antenna, modulate and amplify the RF signal, and transmit the RF signal to the RFIC; and a second transmission signal amplifier configured to: receive the RF signal of the second network frequency band from the RFIC, and transmit the RF signal to the antenna.

7. The electronic device of claim 6, wherein the power supply module is connected to a power source of the first transmission signal amplifier.

8. The electronic device of claim 6, wherein the power supply module is connected to a power source of the second transmission signal amplifier.

9. The electronic device of claim 6, wherein the PMIC is connected to a power source of the first reception signal amplifier.

10. The electronic device of claim 6, wherein the PMIC is connected to a power source of the second reception signal amplifier.

11. The electronic device of claim 4, wherein the variable notch filter is connected to a power source of the first transmission signal amplifier.

12. The electronic device of claim 6, wherein the variable notch filter is connected to a power source of the second transmission signal amplifier.

13. The electronic device of claim 11, wherein the processor is configured to: control the RF signal of the first network frequency band to be radiated through the antenna, and control the variable notch filter to remove a harmonic frequency of the RF signal of the first network frequency band upon receiving the RF signal of the second network frequency band from the antenna.

14. The electronic device of claim 11, wherein the processor is configured to: control the RF signal of the second network frequency band to be radiated through the antenna, and control the variable notch filter to remove a harmonic frequency of the RF signal of the second network frequency band upon receiving the RF signal of the first network frequency band from the antenna.

15. The electronic device of claim 1, wherein the variable notch filter comprises a variable capacitor or a variable inductor controlled by the processor, and is included in the power supply module.

* * * * *